United States Patent
Saito et al.

(10) Patent No.: US 10,637,516 B2
(45) Date of Patent: Apr. 28, 2020

(54) FLAMEPROOF INPUT INTRINSICALLY-SAFE OUTPUT TRANSMITTER

(71) Applicant: YOKOGAWA ELECTRIC CORPORATION, Tokyo (JP)

(72) Inventors: Hitoshi Saito, Tokyo (JP); Yasuhiro Tanaka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/483,429

(22) PCT Filed: Dec. 27, 2017

(86) PCT No.: PCT/JP2017/046884
§ 371 (c)(1),
(2) Date: Aug. 4, 2019

(87) PCT Pub. No.: WO2018/146972
PCT Pub. Date: Aug. 16, 2018

(65) Prior Publication Data
US 2020/0014411 A1    Jan. 9, 2020

(30) Foreign Application Priority Data

Feb. 9, 2017    (JP) ................ 2017-022206

(51) Int. Cl.
*H04B 1/034*    (2006.01)
*H04B 1/04*    (2006.01)
*H04B 1/03*    (2006.01)

(52) U.S. Cl.
CPC ............... *H04B 1/04* (2013.01); *H04B 1/03* (2013.01)

(58) Field of Classification Search
CPC .......... H01B 13/003; H04B 1/03; H04B 1/04; H04B 10/2503; H01R 13/527;
(Continued)

(56) References Cited

U.S. PATENT DOCUMENTS

| | | | |
|---|---|---|---|
| 5,835,534 A * | 11/1998 | Kogure | H02H 9/008 375/257 |
| 7,825,761 B2 * | 11/2010 | Scholz | G01D 11/245 336/83 |
| 9,726,529 B2 * | 8/2017 | Mansfield | G01F 1/8409 |

FOREIGN PATENT DOCUMENTS

| | | |
|---|---|---|
| JP | S63033001 U | 3/1988 |
| JP | H09065441 A | 3/1997 |
| JP | 2016014648 A | 1/2016 |

OTHER PUBLICATIONS

International Search Report dated Mar. 27, 2018 in No. PCT/JP2017/046884.

* cited by examiner

Primary Examiner — Quochien B Vuong
(74) Attorney, Agent, or Firm — Rankin, Hill & Clark LLP

(57) ABSTRACT

To wirelessly transmit, from intrinsically-safe type equipment placed in a hazardous area, a loop electrical signal measurement value obtained from flameproof type equipment. A flameproof input intrinsically-safe output transmitter covered with a flameproof enclosure includes an intrinsically-safe-side terminal connected to an intrinsically-safe built-in battery type wireless device, a flameproof-side electrical signal terminal configured to input a loop electrical signal, and an electrical input signal transmitter circuit configured to measure the loop electrical signal and transmit a signal in accordance with a measurement result to the intrinsically-safe-side terminal.

4 Claims, 3 Drawing Sheets

(58) Field of Classification Search
CPC .............. H01R 31/065; G01L 19/0084; G01L 19/0663; G01L 19/086
USPC ................................................ 455/128, 129
See application file for complete search history.

FLAMEPROOF INPUT INTRINSICALLY-SAFE OUTPUT TRANSMITTER

TECHNICAL FIELD

The present invention relates to the technique of wirelessly transmitting, from intrinsically-safe type equipment placed in a hazardous area, a loop electrical signal measurement value or dry contact status information obtained from flameproof type equipment.

BACKGROUND ART

Generally, a two-wire transmitter receives power-supply voltage supplied via a loop signal line, and outputs an analog DC current signal of 4-20 mA according to, e.g., a measurement value. In recent years, a hybrid communication method for transmitting a digital signal superimposed on an analog DC signal as typified by a highway addressable remote transducer (HART) communication method has been broadly used. Bidirectional communication of the digital signal is performed so that transmitter status information can be acquired and a transmitter parameter can be set, for example.

As illustrated in FIG. 3, in a two-wire transmitter 210 employing such a hybrid communication method, connection with a wireless device 220 is made, an analog signal is transmitted via a loop signal line, and a digital signal is wirelessly transmitted/received via the wireless device 220. Accordingly, even the two-wire transmitter 210 having no wireless communication function can perform digital signal wireless communication.

In an example of this figure, the wireless device 220 includes a built-in communication operation battery. Among the wireless devices 220 with the built-in batteries, one having the function of supplying power of the built-in battery to the two-wire transmitter 210 has been also in practical use.

CITATION LIST

Patent Literature

PATENT LITERATURE 1: JP-A-9-65441

SUMMARY OF THE INVENTION

Problems to be Solved by the Invention

A transmitter configured to measure 4-20 mA loop current of a two-wire transmitter and transmit the resultant measurement value via a wireless signal has been in practical use. Such a transmitter is referred to as a "loop current measurement transmitter." Moreover, transmitter having dry contact status from, e.g., a limit switch and transmitting an acquired dry contact status via a wireless signal has been in practical use. Such a transmitter is referred to as a "dry contact status transmitter."

The case of placing the two-wire transmitter or the limit switch in a hazardous area is assumed.

In the case of 4-20 mA loop current measurement, it is not allowed to insert equipment in the middle of an intrinsically-safe 4-20 mA loop in Japan. Thus, loop current measurement is limited to a flameproof 4-20 mA loop. Thus, in a case where the loop current measurement transmitter is not a flameproof type, a loop current measurement transmitter 240 needs to be placed in a safe area as illustrated in FIG. 4(a).

Note that in this figure, a flameproof type two-wire transmitter 230 is placed in a hazardous area, and a 4-20 mA loop is in a flameproof metal conduit 270. A flameproof sealing device 272 is provided at a connection portion between the flameproof metal conduit 270 and the flameproof type two-wire transmitter 230, and a sealing material 274 is used in the flameproof metal conduit 270.

In the case of dry contact status transmission, almost all generally-used limit switches have flameproof specifications. Thus, in a case where the dry contact status transmitter is not a flameproof type, a dry contact status transmitter 260 needs to be placed in a safe area as illustrated in FIG. 4(b).

Note that in this figure, a flameproof type limit switch 250 is placed in a hazardous area, and a 4-20 mA loop is in the flameproof metal conduit 270. A flameproof sealing device 272 is provided at a connection portion between the flameproof metal conduit 270 and the flameproof type limit switch 250, and an explosive atmosphere sealing material 274 is used in the flameproof metal conduit 270.

As described above, the loop current measurement transmitter and the dry contact status transmitter which are intrinsically-safe but are not flameproof cannot be placed in the hazardous area, and there are limitations on a placement location. For this reason, an advantage that the loop current measurement value and the dry contact status can be wirelessly transmitted cannot be fully utilized. The same problem applies to, e.g., the case of measuring 1-5 V loop voltage instead of the 4-20 mA loop current (the 4-20 mA loop current and the 1-5 V loop voltage are collectively referred to as a "loop electrical signal") and the case of measuring a frequency based on dry contact status input interval.

Thus, the present invention is intended to wirelessly transmit, from intrinsically-safe type equipment placed in a hazardous area, a loop electrical signal measurement value or dry contact status obtained from flameproof type equipment.

Solution to the Problems

For solving the above-described problem, a first aspect of the present invention is a flameproof input intrinsically-safe output transmitter covered with a flameproof enclosure. The transmitter includes an intrinsically-safe-side terminal connected to an intrinsically-safe-built-in battery type wireless device, a flameproof-side electrical signal terminal configured to input a loop current signal, and an electrical input signal transmitter circuit configured to measure the loop current signal and transmit the current value according to a measurement result to the intrinsically-safe-side terminal.

For solving the above-described problem, a second aspect of the present invention is a flameproof input intrinsically-safe output transmitter covered with a flameproof enclosure. The transmitter includes an intrinsically-safe-side terminal connected to an intrinsically-safe built-in battery type wireless device, a flameproof-side dry contact terminal configured to input dry contact status, and an electrical input signal transmitter circuit configured to transmit a signal in accordance with the dry contact status to the intrinsically-safe-side terminal.

In any aspect, the electrical input signal transmitter circuit can perform operation by means of power supplied via the intrinsically-safe-side terminal.

Moreover, the flameproof input intrinsically-safe output transmitter may further include a grounding terminal connected to a minus side of the intrinsically-safe-side terminal.

Effects of the Invention

According to the present invention, the loop current measurement value or the dry contact status obtained from the flameproof type equipment can be wirelessly transmitted from the intrinsically-safe type equipment placed in the hazardous area.

DESCRIPTION OF THE EMBODIMENTS

Figure 1:
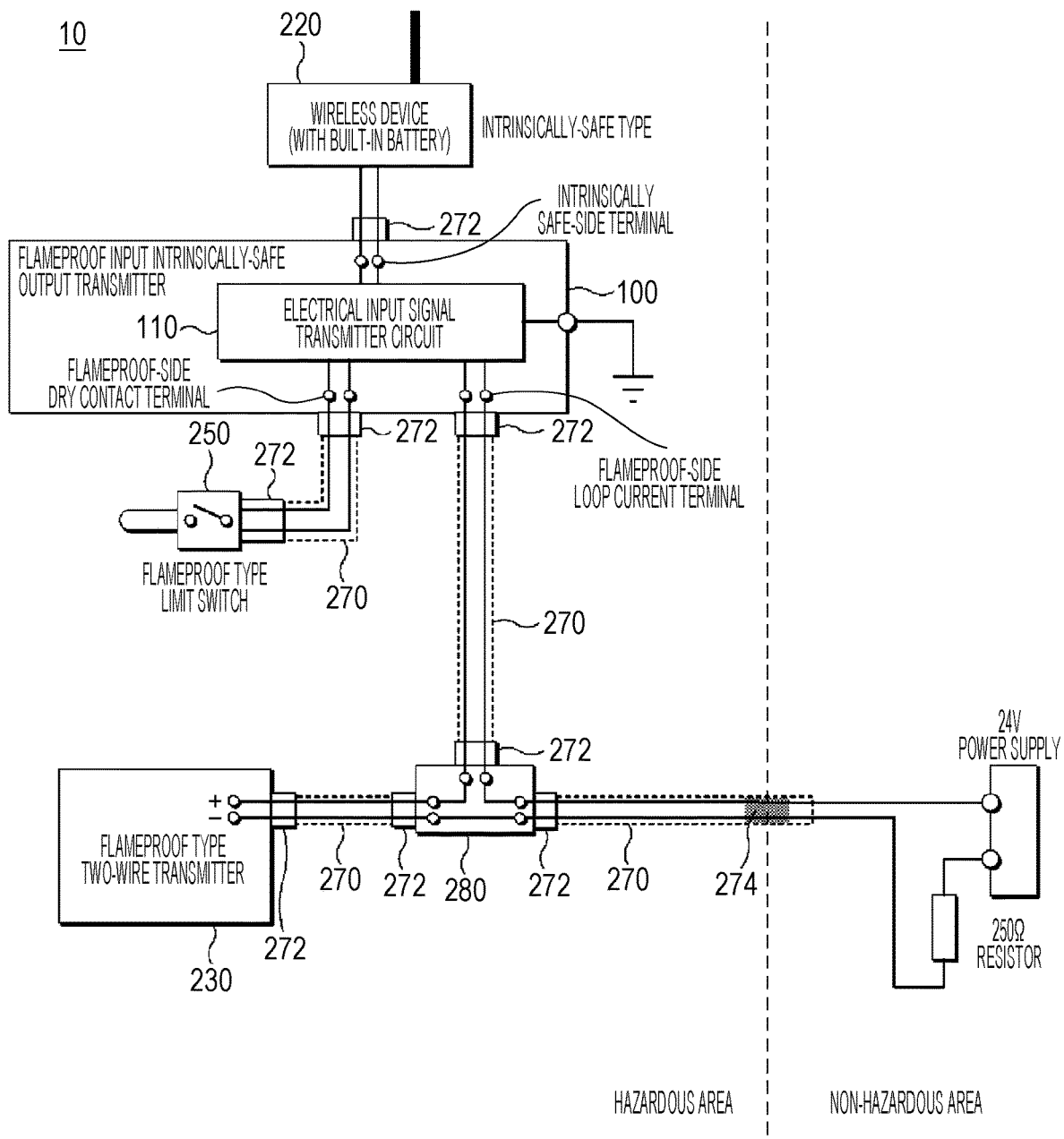
FIG. 1 is a block diagram of a configuration of a transmitter system using a flameproof input intrinsically-safe output transmitter in accordance with the present embodiment.

An embodiment of the present invention will be described with reference to the drawings. FIG. 1 is a block diagram of a configuration of a transmitter system 10 using a flameproof input intrinsically-safe output transmitter 100 according to the present embodiment. The same reference numerals are used to represent blocks similar to those of a typical configuration. The flameproof input intrinsically-safe output transmitter 100 is a transmitter configured to output, to an intrinsically-safe-side, a loop electrical signal or dry contact status input from a flameproof side.

As illustrated in this figure, the transmitter system 10 includes a flameproof type two-wire transmitter 230, a flameproof type limit switch 250, an intrinsically-safe built-in battery type wireless device 220, and the flameproof input intrinsically-safe output transmitter 100. These components are placed at a hazardous area.

The flameproof type two-wire transmitter 230 receives power-supply voltage supplied via a loop signal line, and outputs an analog DC current signal of 4-20 mA in accordance with a measurement value. The flameproof type limit switch 250 is a device configured to detect an operation limit state of a monitoring target device by, e.g., a microswitch, and outputs the dry contact status.

The intrinsically-safe built-in battery type wireless device 220 includes the function of supplying power of a built-in battery to a two-wire transmitter as a connection partner. In the case of using this function, when communication with the two-wire transmitter as the connection partner is made, an operation voltage of around 18 V is first applied to the two-wire transmitter. Accordingly, the two-wire transmitter as the connection partner starts the operation of absorbing a constant current of 4 mA.

Then, the built-in battery type wireless device 220 performs, after a lapse of predetermined time, the operation of transmitting a command by a digital signal to the two-wire transmitter and receiving a response from the two-wire transmitter. The received response is wirelessly transmitted to, e.g., a higher-level system. Note that in the present embodiment, not connection to the two-wire transmitter but connection to the flameproof input intrinsically-safe output transmitter 100 is made. The flameproof input intrinsically-safe output transmitter 100 communicates with the built-in battery type wireless device 220 in a manner similar to that of the two-wire transmitter.

Figure 2:
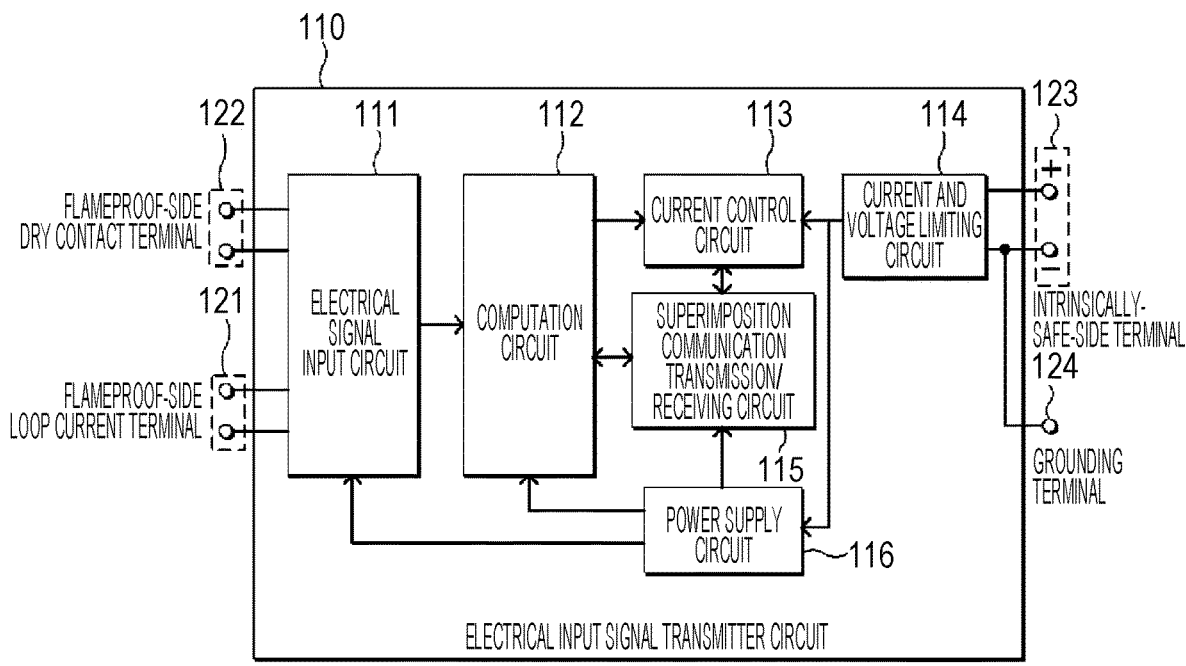
FIG. 2 is a block diagram of a configuration example of an electrical input signal transmitter circuit.
Figure 3:
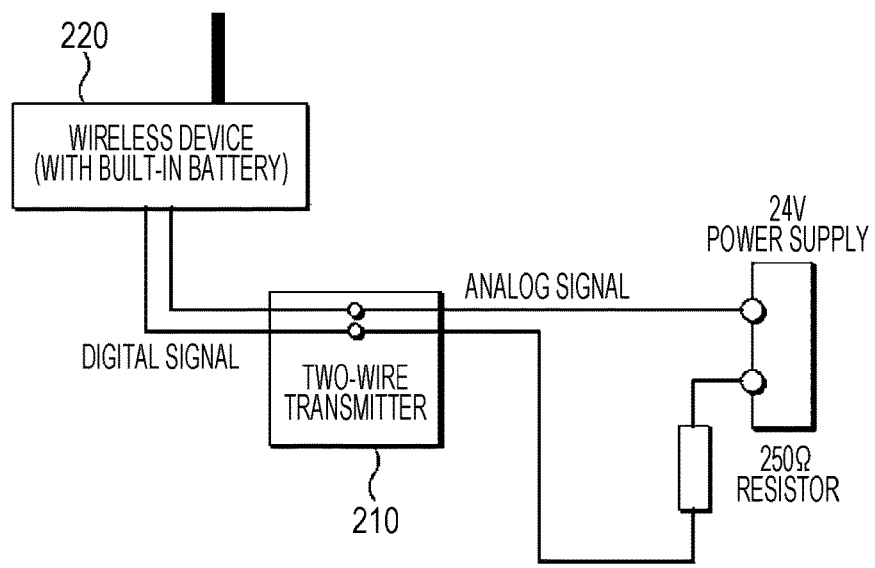
FIG. 3 is a diagram for describing a two-wire transmitter employing a hybrid communication method.
Figure 4:
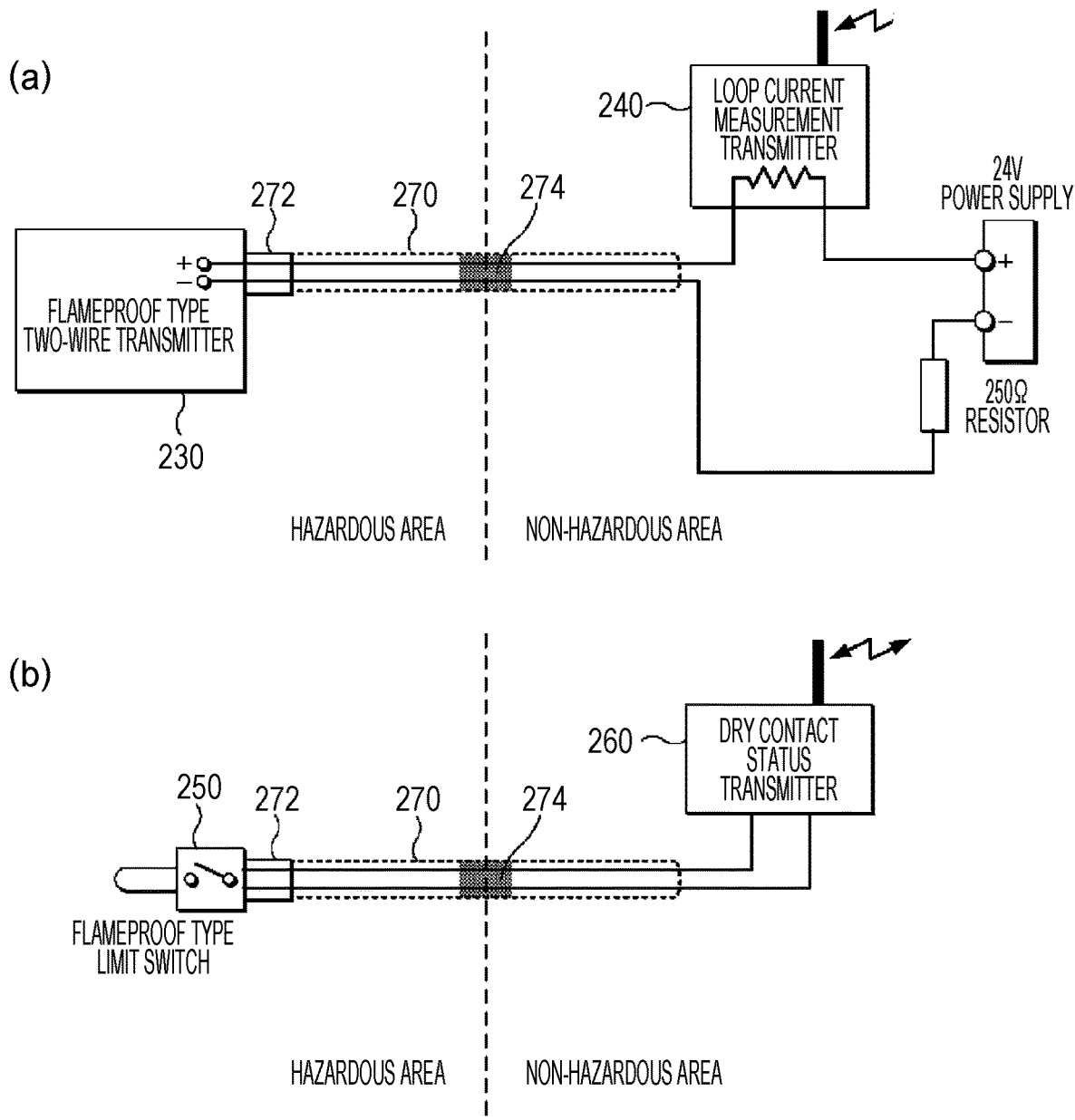
FIG. 4 is a diagram for describing the case of placing a two-wire transmitter or a limit switch in a hazardous area.

The flameproof input intrinsically-safe output transmitter 100 includes an electrical input signal transmitter circuit 110, a flameproof-side loop current terminal 121, a flameproof-side dry contact terminal 122, an intrinsically-safe-side terminal 123, and a grounding terminal 124 (see FIG. 2). Note that either one of the flameproof-side loop current terminal 121 or the flameproof-side dry contact terminal 122 may be provided as a flameproof-side terminal. Alternatively, multiple pairs of the flameproof-side loop current terminal 121 and the flameproof-side dry contact terminal 122 may be provided.

The flameproof-side loop current terminal 121 is connected to the loop signal line of the flameproof type two-wire transmitter 230, and inputs/outputs an analog DC current signal of 4-20 mA for current value measurement. The flameproof-side dry contact terminal 122 is connected to the flameproof type limit switch 250, and inputs the dry contact status.

Input/output of the analog DC current signal of the flameproof-side loop current terminal 121 is performed in such a manner that an electrical wire of one terminal of the loop signal line is drawn in by means of a flameproof junction box 280.

The intrinsically-safe-side terminal 123 is connected to the intrinsically-safe built-in battery type wireless device 220, and performs hybrid communication.

Signal wiring in the hazardous area is covered with a flameproof metal conduit 270, and a flameproof sealing device 272 is used at a joint between the flameproof metal conduit 270 and equipment. Moreover, the flameproof metal conduit 270 is partitioned into a hazardous area and a non-hazardous area by a sealing material 274.

FIG. 2 is a block diagram of a configuration example of the electrical input signal transmitter circuit 110. The electrical input signal transmitter circuit 110 is covered with a flameproof enclosure withstanding a flameproof test. A minus side of the intrinsically-safe-side terminal 123 may be directly connected to the grounding terminal 124.

The electrical input signal transmitter circuit 110 includes an electrical signal input circuit 111, a computation circuit 112, a current control circuit 113, a current voltage limiting circuit 114, a superimposition communication transmission receiving circuit 115, and a power supply circuit 116.

The electrical input signal transmitter circuit 110 operates the power supply circuit 116 by means of power supplied from the built-in battery type wireless device 220 connected to the intrinsically-safe-side terminal 123, thereby producing operation power.

In operation, the electrical signal input circuit ill performs measurement of an analog DC current signal of 4-20 mA input to the flameproof-side current terminal 121 and measurement of the dry contact status input to the flameproof-side dry contact terminal 122.

Moreover, the computation circuit 112 performs computation in accordance with a preset relational expression, and, e.g., the processing of sinking current in accordance with a flameproof-side input electrical signal from the intrinsically-safe-side terminal 123 by the current control circuit 113 is performed.

Further, when receiving a command from the built-in battery type wireless device 220 via the hybrid communication, the computation circuit 112 interprets the command, and controls the superimposition communication transmission/receiving circuit 115 to transmit, as a response via the hybrid communication, a flameproof input-side measurement result to the built-in battery type wireless device 220 via the current control circuit 113.

Specifically, the built-in battery type wireless device 220 transmits, to the flameproof input intrinsically-safe output transmitter 100, a signal in accordance with a command for the flameproof input intrinsically-safe output transmitter 100, the signal being wirelessly received from, e.g., the higher-level system. The command is, for example, acquisition of an analog DC current signal value or acquisition of the dry contact status.

The flameproof input intrinsically-safe output transmitter 100 transmits, as a response to such a command, a measurement result of an analog DC current signal of 4-20 mA and a digital signal of the dry contact status input to the flameproof-side dry contact terminal 122 to the built-in battery type wireless device 220. Then, the built-in battery type wireless device 220 performs wireless transmission to, e.g., the higher-level system.

Accordingly, the built-in battery type wireless device 220 can grasp a flameproof input-side electrical signal state of the flameproof input intrinsically-safe output transmitter 100, and can transmit such a state to, e.g., the higher-level system via a wireless signal.

The current and voltage limiting circuit 114 is a circuit configured not to perform specified electrical output or more to the intrinsically-safe-side terminal 123 even when a voltage source of 250 VAC, 1500 A is connected to the flameproof-side terminal (the flameproof-side current terminal 121, the flameproof-side dry contact terminal 122), and may be configured using, e.g., a fuse, a diode, and a zener diode. Further, the minus side of the intrinsically-safe-side terminal 123 may be connected to a grounding within 1 ohm or an equipotential bonding system via the grounding terminal 124 such that current outflow from the minus side of the intrinsically-safe-side terminal 123 to the built-in battery type wireless device 220 is prevented.

As described above, the flameproof input intrinsically-safe output transmitter 100 of the present embodiment has the flameproof-side terminal to transmit the flameproof-side electrical signal state to the intrinsically-safe-side terminal via the hybrid communication using the 4-20 mA electrical signal and the digital signal. The intrinsically-safe wireless device is connected to the intrinsically-safe-side terminal so that a flameproof 4-20 mA current signal value and a flameproof limit switch electrical signal value can be converted into wireless signals and be transmitted in the hazardous area.

Note that the present invention is not limited to the above-described embodiment, and various modifications can be made. For example, the signal input from the flameproof-side terminal is not limited to the 4-20 mA analog DC current signal and the dry contact status. For example, instead of the 4-20 mA current signal, the signal may be one indicating a voltage signal of DC 1-5 V or a resistance value. Alternatively, the dry contact status may be, for example, information indicating a cycle length for frequency measurement. In the case of inputting a voltage signal of DC 1-5 V, the flameproof input intrinsically-safe output transmitter 100 is connected in parallel with the two-wire transmitter.

Moreover, the flameproof side and the intrinsically safe side may be electrically insulated from each other. The hybrid communication may be made between the flameproof side and the intrinsically safe side.

Further, for each of the flameproof-side and intrinsically-safe-side terminals, a cable wiring method, instead of the metal conduit method, may be used. In this case, preferably, a sealing device equivalent to the flameproof sealing device is installed.

LIST OF REFERENCE NUMERALS 10 transmitter system
100 flameproof input intrinsically-safe output transmitter
110 electrical input signal transmitter circuit
111 electrical signal input circuit
112 computation circuit
113 current control circuit
114 current voltage limiting circuit
115 superimposition communication transmission/receiving circuit
116 power supply circuit
121 flameproof-side current terminal
122 flameproof-side dry contact terminal
123 intrinsically-safe-side terminal
124 grounding terminal
210 two-wire transmitter
220 built-in battery type wireless device
230 flameproof type two-wire transmitter
240 loop current measurement transmitter
250 flameproof type limit switch
260 dry contact status transmitter
270 flameproof metal conduit
272 flameproof sealing device
274 sealing material
280 flameproof junction box

The invention claimed is:

1. A flameproof input intrinsically-safe output transmitter covered with a flameproof enclosure, comprising:
   an intrinsically-safe-side terminal connected to an intrinsically-safe built-in battery type wireless device;
   a flameproof-side electrical signal terminal configured to input a loop electrical signal; and
   an electrical input signal transmitter circuit configured to measure the loop electrical signal and transmit a signal according to a measurement result to the intrinsically-safe-side terminal.

2. The flameproof input intrinsically-safe output transmitter according to claim 1, wherein
   the electrical input signal transmitter circuit performs operation by means of power supplied via the intrinsically-safe-side terminal.

3. The flameproof input intrinsically-safe output transmitter according to claim 1, further comprising:
   a grounding terminal connected to a minus side of the intrinsically-safe-side terminal.

4. A flameproof input intrinsically-safe output transmitter covered with a flameproof enclosure, comprising:
   an intrinsically-safe-side terminal connected to an intrinsically-safe built-in battery type wireless device;
   a flameproof-side dry contact terminal configured to input dry contact status; and
   an electrical input signal transmitter circuit configured to transmit a signal in accordance with the dry contact status to the intrinsically-safe-side terminal.

* * * * *